June 1, 1954  W. KOHLHAGEN  2,679,722
ESCAPEMENT
Filed June 18, 1951  2 Sheets-Sheet 1
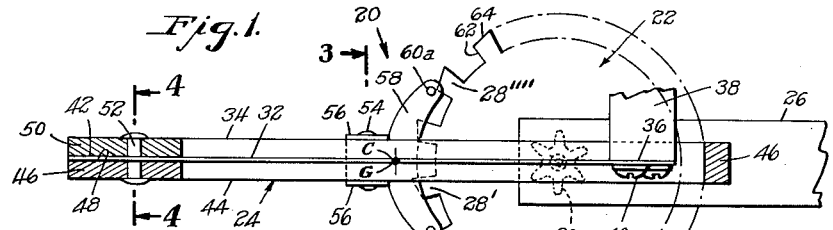
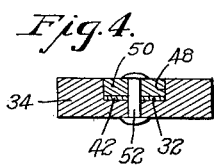
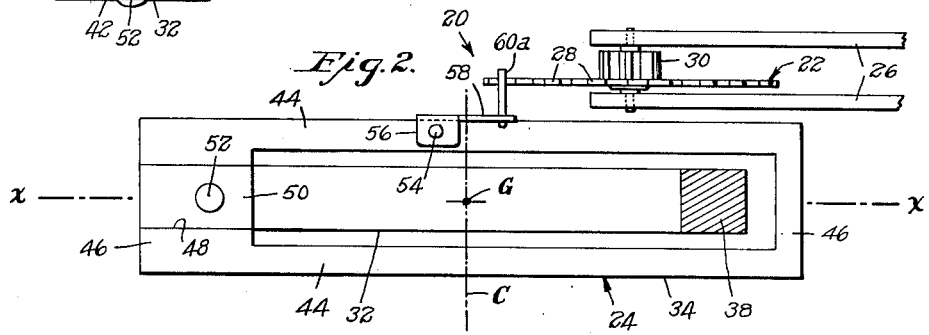
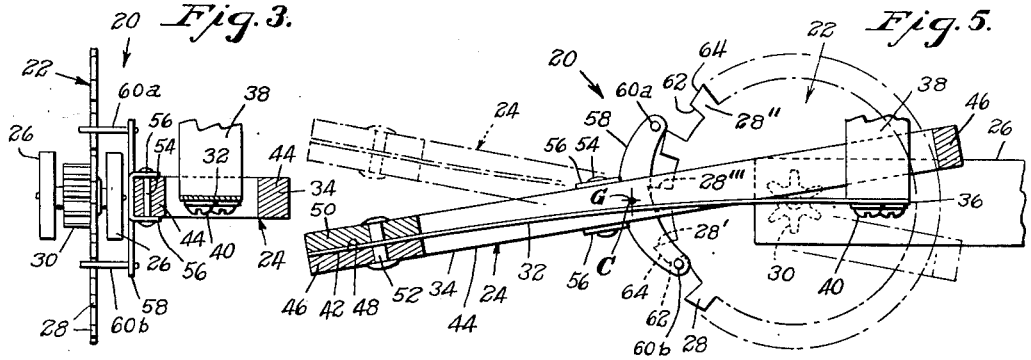
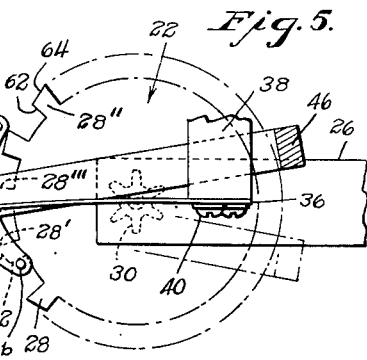
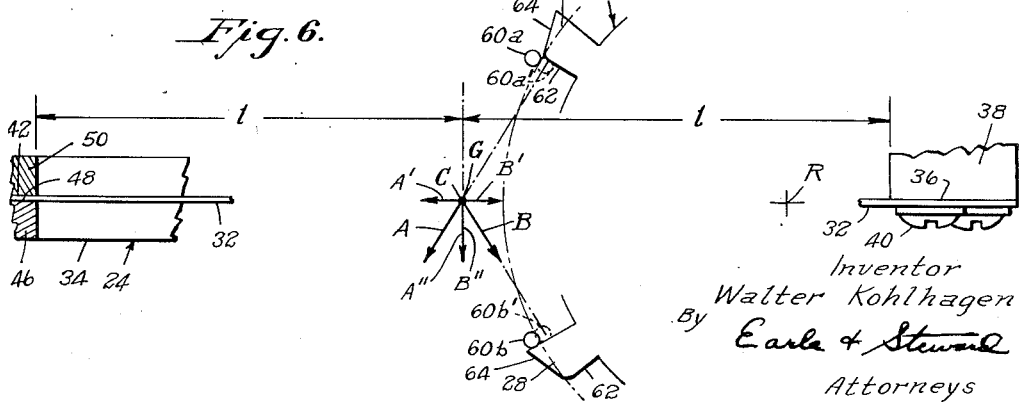
Inventor
Walter Kohlhagen
By Earle & Stewart
Attorneys June 1, 1954 W. KOHLHAGEN 2,679,722
ESCAPEMENT
Filed June 18, 1951 2 Sheets-Sheet 2
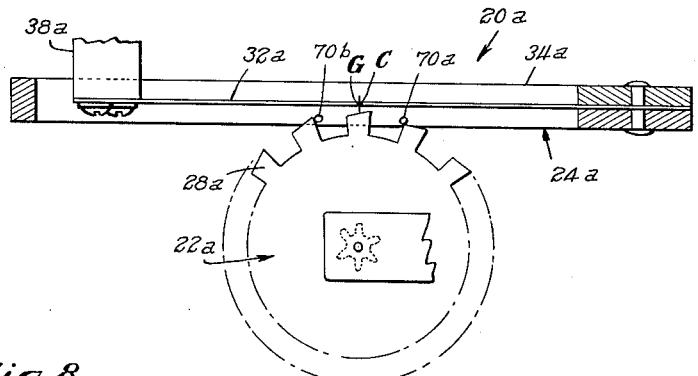
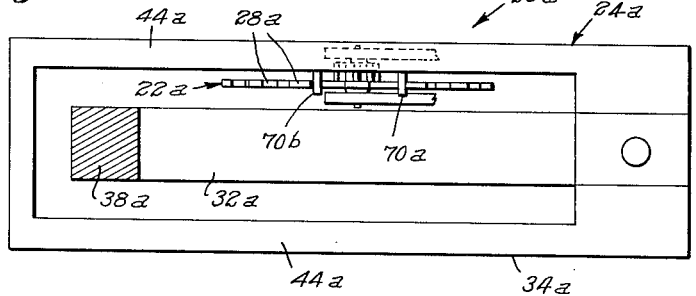
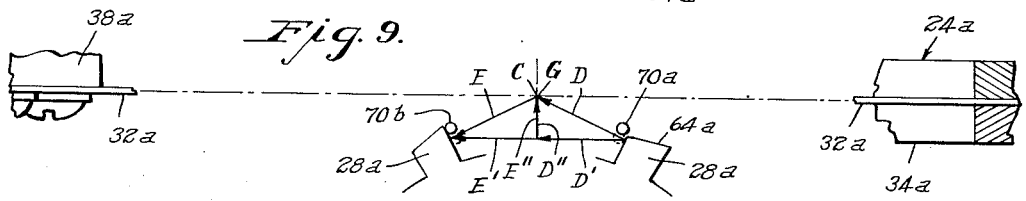
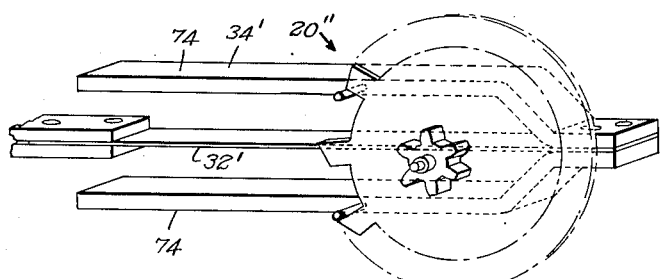
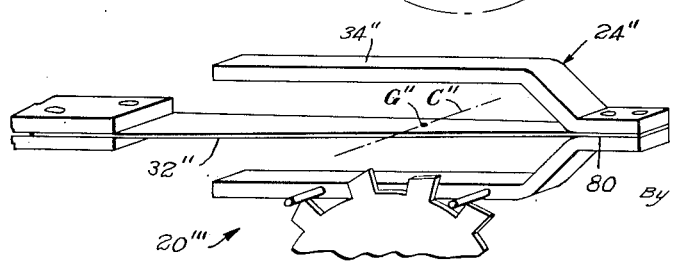
Inventor
Walter Kohlhagen
By Earle & Stewart
Attorneys Patented June 1, 1954

2,679,722

UNITED STATES PATENT OFFICE 2,679,722

ESCAPEMENT

Walter Kohlhagen, Elgin, Ill., assignor to The E. Ingraham Company, Bristol, Conn., a corporation of Connecticut Application June 18, 1951, Serial No. 232,122

22 Claims. (Cl. 58—116)

This invention relates to escapements for power-drives in general, and for timing devices in particular.

It is a principal object of the present invention to provide for power-drives in general, and for power-drives of timing devices in particular, a mechanical escapement which is not only far simpler and sturdier in construction and more reliable and accurate in operation, but also much less affected by shock and vibration, than previous escapements.

Another object of the present invention is to embody all of an escapement, save the escape-member itself, in a single resilient oscillator-unit which is pivotless and, hence, devoid of external frictional resistance in its operation, so that the oscillator-unit requires no lubrication and has an exceptionally long useful life.

It is a further object of the present invention to provide an escapement of the aforementioned single-oscillator type which requires little power for sustained oscillation and derives periodic oscillating impulses solely from the escape-member.

Another object of the present invention is to provide an escapement of the aforementioned single-oscillator type which requires for the reliable and accurate performance of its designated function but a small amplitude of oscillation and, hence, less acceleration and deceleration of its mass than conventional mechanical escapements with their lively acting inertia masses.

A further object of the present invention is to provide an escapement of the aforementioned single-oscillator type which, by virtue of its small amplitude of oscillation, reacts with the escape member in a less abrupt fashion than the escape-lever of a conventional balance-wheel type escapement, and is, in consequence, less noisy and more reliable in operation than the latter.

It is another object of the present invention to embody the aforementioned oscillator-unit in the structurally exceedingly simple form of a rigid inertia-mass carrying spaced pallets, and a leaf-type spring by means of which the inertia-mass is suspended from a support in a fashion permitting it to oscillate so as to bring the pallets alternately into play with the associated escape member.

It is a further object of the present invention to coordinate the inertia-mass and leaf-spring of the aforementioned oscillator unit so that the axis of oscillation of the latter passes through, or substantially through, the center of gravity of the inertia member, whereby the escapement is little, if at all, affected in its accurate performance by ordinary shock or vibration.

Another object of the present invention is to provide an escapement of the aforementioned single-oscillator type which permits the construction of the escape-wheel in any desired diameter and its location in any desired proximity to the oscillation-unit, thereby removing practically all previous obstacles to the attainment of a dead-beat escapement without sacrificing good lock or throw characteristics of the same.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a side-elevation, partly in section, of an escapement embodying the present invention;

Fig. 2 is a top-plan view of the same escapement;

Fig. 3 is a section taken on the line 3—3 of Fig. 1;

Fig. 4 is a section taken on the line 4—4 of Fig. 1;

Fig. 5 is a view similar to Fig. 1, showing the escapement in different positions of operation in full lines and dot-and-dash lines, respectively;

Fig. 6 is an enlarged diagrammatic view illustrating the coordination of certain prominent parts of the escapement;

Fig. 7 is a side-elevation, partly in section, of an escapement embodying the present invention in a modified manner;

Fig. 8 is a top-plan view of the modified escapement shown in Fig. 7;

Fig. 9 is an enlarged diagrammatic view illustrating the coordination of certain prominent parts of the modified escapement of Figs. 7 and 8;

Fig. 10 is a perspective view of an escapement embodying the present invention in a further modified manner; and Fig. 11 is a perspective view of an escapement embodying the present invention in still another modified manner.

Referring to the drawings, and more particularly to Figs. 1 to 5 thereof, the reference numeral 20 designates an escapement which comprises an escape member or wheel 22 and an oscillatory unit 24. The escape-wheel 22, which is journalled in a suitable support 26 and provided with identical peripheral teeth 28, is coupled with a power-drive (not shown) through intermediation of a gear 30, for instance.

The oscillatory unit 24 comprises, in the present instance, a leaf-type spring 32 and a rigid inertia mass or member 34. The leaf-spring 32 is mounted with one end 36 thereof on a fixed support 38 by means of a suitably locked screw or screws 40, for instance, and the inertia-member 34 is carried by the opposite end 42 of the leaf-spring 32 in a manner to be described. The inertia-member 34 is, in the present instance, in the form of a rectangular frame having opposite side-bars 44 and opposite end-bars 46. One of the end-bars 46 of the inertia-member 34 is, in this instance, grooved as at 48 for the reception of the spring-end 42 which is suitably anchored therein by means of a filler-block 50 and a rivet 52, for instance (see also Fig. 4).

Riveted or otherwise secured at 54 to one of the side-bars 44 of the inertia-member 34 are spaced lugs 56 of a side-plate 58 which carries spaced pallets 60a and 60b that are adapted alternately to react with succeeding teeth 28 of the escape-wheel 22 in a manner described hereinafter.

The unit 24 will, on receiving periodic oscillatory impulses from the teeth 28 of the escape-wheel 22 in a manner to be described, oscillate about the axis C through an amplitude similar to or like that indicated by the full-line and dot-and-dash line positions of the unit in Fig. 5, which may be considered to be the extreme end positions of the unit. Further, the escape-direction of the wheel 22 is in the present instance, counter-clockwise as viewed in Fig. 5. Thus, the "let-off" pallet 60b is, in the full-line end position of the unit 24, in locking engagement with the tooth 28' of the escape-wheel 22, while the "receiving" pallet 60a is retracted from the wheel-teeth 28, wherefore the escape-wheel 22 is then in an intermittent stop position. As the unit 24 starts to swing from the full-line position toward the dot-and-dash line position in Fig. 5, the let-off pallet 60b will clear the leading or stop flank 62 of the tooth 28' and thereby release the wheel 22 for the next escape-step. The pallets 60a and 60b are so coordinated that the receiving pallet 60a will move into the path of the stop flank 62 of the next wheel-tooth 28'' approximately when the other pallet 60b clears the stop flank 62 of the wheel-tooth 28', so that escape-wheel 22 will, at the end of the next escape-step thereof, assuredly be stopped by the receiving pallet 60a with which the wheel-tooth 28'' will then be in locking engagement. Also, the let-off pallet 60b will, immediately on clearing the stop-flank 62 of the wheel-tooth 28', receive from the cam-shaped top 64 of the latter an oscillatory impulse which is directed clockwise as viewed in Fig. 5. This oscillatory impulse is transmitted to the unit 24 when the latter is well on its way toward the dot-and-dash line position (Fig. 5), and the unit 24 will continue to move in this direction until the increasingly flexed spring 32 reverses the direction of oscillation of the unit 24 when the latter arrives at the dot-and-dash line position. On the following reverse oscillation of the unit 24, the receiving pallet 60a will clear the stop-flank 62 of the wheel-tooth 28'' and thereby release the escape-wheel 22 for the following escape-step, while the let-off pallet 60b will move into the path of the next wheel-tooth 28''' to stop the escape-wheel at the end of said following escape-step. Further, the receiving pallet 60a will, immediately on clearing the stop-flank 62 of the wheel-tooth 28'', receive from the cam-shaped top 64 of the latter an oscillatory impulse which is transmitted to the unit 24 in a counter-clockwise direction as viewed in Fig. 5. The pallets 60a and 60b thus come into alternate play and react with succeeding teeth 28 of the escape-wheel 22 in receiving oscillatory impulses therefrom and permitting periodic step-by-step escape of the latter. When the power-drive is idle, the oscillator-unit will, by the urgency of the spring 32, assume the rest position shown in Fig. 1 in which the pallets 60a and 60b are out of the path of the stop-flanks 62 of the wheel-teeth 28, but in the path of the cam-shaped tops 64 of the later (see also the full-line positions of the pallets in Fig. 6), so that the next active wheel-tooth, in this instance, the wheel-tooth 28'''' (Fig. 1), will start the oscillation of the unit 24 when the power-drive is again operative.

The leaf-spring 32 and inertia-member 34 of the oscillator-unit 24 are so coordinated that the center of gravity G of the inertia-member lies very near, and preferably on, the oscillatory axis C of the unit. Assuming that the free length of the spring 32 between the ends 36 and 42 thereof is of uniform width throughout, the oscillatory axis C will rectangularly intersect the spring 32 midway of the free length of the latter as indicated by the distances $l$ in Fig. 6, and the inertia-member will have to be arranged so that its center of gravity G lies near, and preferably on, this axis. Preferably, also, the inertia-member 34 is so arranged that its center of gravity G lies as close as possible to the central longitudinal axis $x$—$x$ of the leaf-spring 32 (Fig. 2). To this end, the mass of the inertia-member 34 is substantially equally distributed on the opposite sides of the central longitudinal axis $x$—$x$ of the spring 32. In view of the fact that the center of gravity G of the inertia-member 34 lies on, or substantially on, the oscillatory axis C of the unit 24, the latter is in its normal oscillation disturbed very little, if at all, by ordinary shock or vibration.

While the oscillatory impulses imparted by the wheel-teeth 28 to the pallets 60a and 60b set-up rotary couples in the unit 24 which sustain its continuous oscillation at uniform frequency, all other forces from the escape-wheel 22 against the unit 24 should be prevented from setting-up such rotary couples in the unit 24 so as not to interfere with the normal oscillation of the latter. These other forces are the periodic thrusts of succeeding wheel-teeth 28 against the pallets 60a and 60b, and in order that these thrusts may not set up rotary couples in the oscillating unit 28, they are directed so as to pass through the oscillatory axis C of the unit 24. To this end, the teeth 28 of the escape-wheel 22 are so designed that the stop flank 62 of each tooth lies, when in locking engagement with either pallet 60a or 60b, in a plane substantially at right angles to the plane in which the locking pallet and the oscillatory axis C of the unit 24 lie (Fig. 6). Thus, the thrust from the stop-flank 62 of each tooth 28 against the receiving pallet 60a is indicated by the vector A in Fig. 6, said vector extending at right angles to the flank 62 of the pallet-engaging tooth 28 and passing through the oscillatory axis C and also through the receiving pallet in the dot-and-dash line position 60a' in which the latter may be assumed to be struck by the adjacent wheel tooth 28 when the same moves thereagainst. The thrust from the stop flank 62 of each tooth against the let-off pallet 60b is equal to the thrust from each tooth against the receiving pallet 60a, and is indicated by the vector B (Fig. 6) which in a similar manner passes through the let-off pallet in the dot-and-dash line position 60b' thereof in which the latter may be assumed to be struck by each tooth 28. Since the teeth 28 of the escape-wheel 22 are identical, the before-mentioned thrust-vectors A and B will be equal and pass through the oscillatory axis C of the unit 24 only if the pallets 60a and 60b are equally spaced from the oscillatory axis C of the unit 24 and also from the rotary axis R of the escape-wheel 22, when the unit 24 is at rest. That these conditions prevail in the present instance is clearly indicated in Fig. 6 in which the pallets assume the respective full-line positions when the unit 24 is at rest. Accordingly, since the thrust-vectors A and B pass through the oscillatory axis C of the unit 24, the normal oscillation of the latter is in nowise affected by the clash of the stop-flank 62 of each wheel-tooth with either pallet.

The thrust-vectors A and B (Fig. 6) have components A', B' and A'', B'' which are directed longitudinally of the spring 32 and at right angles thereto, respectively. Of these, the components A' and B' create harmless tensile and compressive stresses, respectively, in the spring 32, and the components A'' and B'' cause or tend to cause, translatory movement of the unit 24 transversely of the spring 32 which is, however, of such small magnitude as not to interfere in the least with the reliable and accurate performance of the escapement.

The forces imparted by the cam-shaped tops 64 of the wheel-teeth 28 to the pallets 60a and 60b and transmitted to the unit 24 as oscillatory impulses, have similar components directed longitudinally of the spring 32 and at right angles thereto. These components are, however, as harmless as the previously described components A', B' and A'', B'' insofar as the reliable and accurate performance of the escapement is concerned.

The instant mechanical escapement is, in comparison to conventional balance-wheel type escapements, exceedingly simple and sturdy in construction, and is in its reliable and accurate performance disturbed very little, if at all, by ordinary shock or vibration. By being pivotless, the oscillator unit of the instant escapement is devoid of external frictional resistance in its operation and, hence, requires no lubrication and has an exceptionally long useful life. Further, the oscillator-unit of the instant escapement requires little power for sustained oscillation, and this power is derived solely from the escape-wheel. Also, the oscillator unit of the present escapement requires for its reliable and accurate performance but a small amplitude of vibration and, hence, less acceleration and deceleration of its mass than conventional balance-wheel type escapements with their lively-acting inertia masses, wherefore the instant oscillator unit reacts with the escape-wheel in a much less abrupt fashion and is, in consequence, less noisy and more reliable in operation than previous mechanical escapements. Moreover, the oscillator-unit of the present escapement permits the construction of the escape-wheel in any desired diameter and its location in any desired proximity to the oscillator-unit, thereby removing practically all previous obstacles to the attainment of a dead-beat escapement without sacrificing good lock and throw characteristics of the same.

Figs. 7 and 8 show a modified escapement 20a which is in all major respects identical with the previously described escapement 20, except that the escape-wheel 22a lies primarily on one side of the plane of the spring 32a so that its peripheral teeth 28a may come into play and react with pallets 70a and 70b which are carried directly by the inertia member 34a. The escape-direction of the wheel 22a may be assumed to be counter-clockwise as viewed in Figs. 7 and 9, in which case the pallets 70a and 70a are the receiving and let-off pallets, respectively. The instant modified escapement 20a secures all the advantages of the previously described escapement 20, although the forces acting thereon are of different magnitudes. Thus, the vectors D and E (Fig. 9), which represent the thrusts from the teeth 28a of the wheel 22a against the pallets 70a and 70b, respectively, form much more acute angles with the longitudinal axis of the oscillator unit 24a than do the vectors A and B (Fig. 6) in the previously described escapement 20, wherefore the components D', E' of the vectors D and E create harmless tensile or compressive stresses in the spring 32a, while the transverse components D'' and E'' are considerably smaller in magnitude than the corresponding components A'' and B'' in the previously described escapement and, hence, have a lesser tendency to cause translatory movement of the unit 24a. On the other hand, while the translatory components, transversely of the spring 32, of the forces imparted by the cam-shaped tops 64a of the wheel-teeth 28a to the pallets 70a and 70b are greater than in the previous escapement, these translatory components remain so small that they will not interfere with the reliable and accurate performance of the instant modified escapement.

Assuming that the escape-direction of the wheel 22a be, as stated hereinbefore, counter-clockwise as viewed in Fig. 9, the fixed support 38a for the spring 32a is preferably so located, to the left of the wheel 22a in the present instance (Fig. 9), that the components E' and D' of the forces E and D, respectively, create in the spring 32a compressive stresses which have a tendency to counteract translatory movement of the unit 24a transversely of the spring 32a.

As best shown in Fig. 8, the pallets 70a and 70b project in this instance inwardly from one of the side-bars 44a of the inertia-member 34a, and the escape-wheel 22a extends between said side bar and the adjacent side edge of the spring 32a, wherefore the thrusts from the teeth 28 of the wheel 22a against the pallets 70a and 70b will create in the spring 32a less torsional stress than do the thrusts A and B in the previous escapement 20 in which the pallets 60a and 60b project outwardly from the inertia-member 34. However, these torsional stresses fail, in either form of the escapement, adversely to affect the reliable and accurate performance of the escapement.

Reference is now had to Fig. 10 which shows a further modified escapement 20'' that may have all the advantages of the previously described escapements, and be constructed like the latter, except that the inertia-member 34' is in the general shape of a fork the opposite legs 74 of which face and are spaced from the opposite faces, respectively, of the spring 32'.

Fig. 11 shows a further modified escapement 20''' which is of the same general construction as the escapement of Fig. 10, and differs therefrom by the use of a tapering leaf-spring 32''. Due to the taper in the spring 32'', the oscillatory axis C″ of the unit 24″ no longer passes across the spring midway of its free length, but shifts to some extent toward the narrow end 80 of the spring. The inertia-member 34″ is accordingly dimensioned so that its center of gravity G″ lies on, or substantially on, the oscillatory axis C″.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An escapement, comprising a power-impelled escape-member having spaced teeth; a fixed support; a leaf-type spring mounted with one end on said support; a rigid inertia-mass mounted on the other end of said spring so that the intermediate length of said spring is resiliently flexible and forms with said inertia-mass an oscillatory unit the oscillatory axis of which extends intermediate and at right angles to said spring length; and two pallets provided on said inertia-mass on opposite sides, respectively, of said oscillatory axis and adapted alternately to react with succeeding teeth, respectively, of said member in receiving oscillatory impulses therefrom and permitting periodic escapes of the latter.

2. As escapement, comprising a power-impelled escape-member having spaced teeth; a fixed support; a leaf-type spring mounted with one end on said support; a rigid inertia-mass mounted on the other end of said spring so that the intermediate length of the latter is resiliently flexible and forms with said inertia-mass an oscillatory unit the oscillatory axis of which extends at right angles to said spring length, said inertia-mass being so arranged that its center of gravity lies intermediate said flexible spring length; and two pallets provided on said inertia-mass on opposite sides, respectively, of its center of gravity, and adapted alternately to react with succeeding teeth, respectively, of said member in receiving oscillatory impulses therefrom and permitting periodic escapes of the latter.

3. An escapement, comprising a power-impelled escape-member having spaced teeth; a fixed support; a leaf-type spring mounted with one end on said support; a rigid inertia-mass mounted on the other end of said spring so that the intermediate length of said spring is resiliently flexible, said inertia-mass and spring length being coordinated to form an oscillatory unit the oscillatory axis of which extends at right angles to said spring length and passes substantially through the center of gravity of said inertia-mass; and two pallets provided on said unit on opposite sides, respectively, of its oscillatory axis and adapted alternately to react with succeeding teeth, respectively, of said member in receiving oscillatory impulses therefrom and permitting periodic escapes of the latter.

4. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said inertia mass and spring length being coordinated to form an oscillatory unit the oscillatory axis of which passes substantially through the center of gravity of said inertia-mass and extends at right angles to said spring length and substantially parallel to the rotary axis of said escape-wheel; and two pallets provided on said inertia-mass on opposite sides, respectively, of said oscillatory axis, and adapted alternately to react with succeeding teeth, respectively, of said wheel in receiving oscillatory impulses therefrom and permitting periodic escapes of the latter.

5. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said inertia-mass and spring length being coordinated to form an oscillatory unit the oscillatory axis of which passes substantially through the center of gravity of said inertia-mass and extends at right angles to said spring length and substantially parallel to the rotary axis of said escape-wheel; and two pallets on said inertia-mass on opposite sides of, and equally spaced from, the plane in which said axes lie, said pallets being also equally spaced from said rotary axis when said unit is at rest, and adapted alternately to react with succeeding teeth, respectively, of said wheel in receiving oscillatory impulses therefrom and permitting periodic escapes of the latter.

6. An escapement as set forth in claim 5, in which the teeth of said wheel are so shaped that the thrust exerted by each tooth against either pallet on its movement into locking engagement with the latter is in a direction substantially intersecting the oscillatory axis of said unit.

7. An escapement as set forth in claim 5, in which said pallets extend substantially parallel to said oscillatory axis, and the teeth of said wheel have leading plane flanks, respectively, facing in the escape-direction of said wheel, of which the plane of the leading flank of each tooth, when in locking engagement with either pallet, extends substantially at right angles to the plane in which said engaging pallet and said oscillatory axis lie.

8. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said inertia-mass and spring length being coordinated to form an oscillatory unit the oscillatory axis of which passes substantially through the center of gravity of said inertia-mass and extends at right angles to said spring length and substantially parallel to the rotary axis of said escape-wheel, and said rotary axis substantially intersects the longitudinal axis of said unit when the latter is at rest; and two pallets on said inertia-mass on opposite sides, respectively, of the plane in which said oscillatory and rotary axes lie, said pallets being adapted alternately to react with succeeding teeth, respectively, of said wheel in receiving oscillatory impulses therefrom and permitting periodic escapes of the latter.

9. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said inertia-mass and spring length being coordinated to form an oscillatory unit the oscillatory axis of which passes substantially through the center of gravity of said inertia-mass and extends at right angles to said spring length and substantially parallel to the rotary axis of said escape-wheel, and said rotary axis lies in a plane passing through said oscillatory axis and extending substantially at right angles to the longitudinal axis of said unit when the latter is at rest; and two pallets provided on said inertia-mass on opposite sides, respectively, of said plane, and adapted alternately to react with succeeding teeth, respectively, of said wheel in receiving oscillatory impulses therefrom and permitting periodic escapes of the latter.

10. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, the central longitudinal axis of said spring length being, in the non-flexed condition of the latter, substantially coextensive with the central longitudinal axis of said inertia-mass and the latter being so arranged as to form with said spring length an oscillatory unit the oscillatory axis of which extends at right angles to said spring length and substantially parallel to the rotary axis of said escape wheel and passes substantially through the center of gravity of said inertia-mass; when said unit is at rest; and two pallets on said inertia-mass on opposite sides, respectively, of the plane in which said oscillatory and rotary axes lie, said pallets being adapted alternately to react with succeeding teeth, respectively, of said wheel in receiving oscillatory impulses therefrom and permitting periodic escapes of the latter.

11. An escapement as set forth in claim 10, in which the rotary axis of said escape-wheel lies substantially in the plane in which said spring length lies when said unit is at rest.

12. An escapement as set forth in claim 10, in which the rotary axis of said escape-wheel lies in a plane passing through the center of gravity of said inertia-mass and extending substantially at right angles to said spring length when said unit is at rest.

13. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said inertia-mass including opposite legs flanking and being spaced from the opposite side-edges, respectively, of said spring length, and said inertia-mass being arranged so as to form with said spring length an oscillatory unit the oscillatory axis of which passes substantially through the center of gravity of said inertia-mass and extends at right angles to said spring length and substantially parallel to the rotary axis of said escape-wheel; and two pallets provided on one of said legs on opposite sides, respectively, of the plane in which said axes lie, said pallets being adapted alternately to react with succeeding teeth, respectively, of said wheel in receiving oscillatory impulses therefrom and permitting periodic escapes of the latter.

14. An escapement as set forth in claim 13, in which said pallets extend substantially parallel to the oscillatory axis of said unit.

15. An escapement as set forth in claim 13, in which said pallets project entirely outside the confines of said spring length and extend substantially parallel to the oscillatory axis of said unit, said pallets are equally spaced from the plane in which said axes lie, and are also equally spaced from said rotary axis when said unit is at rest, and the teeth of said wheel are so shaped that the thrust exerted by each tooth against either pallet on its movement into locking engagement with the latter is in a direction substantially intersecting the oscillatory axis of said unit.

16. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said inertia-mass including opposite legs flanking and being spaced from the opposite faces, respectively, of said spring length, and said inertia-mass being arranged so as to form with said spring length an oscillatory unit the oscillatory axis of which passes substantially through the center of gravity of said inertia-mass and extends at right angles to said spring length and substantially parallel to the rotary axis of said escape-wheel; and two pallets provided on said inertia-mass on opposite sides, respectively, of the plane in which said axes lie, said pallets being adapted alternately to react with succeeding teeth, respectively, of said wheel in receiving oscillatory impulses therefrom and permitting periodic escapes of the latter.

17. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said inertia-mass and spring length being coordinated to form an oscillatory unit the oscillatory axis of which passes substantially through the center of gravity of said inertia-mass and extends at right angles to said spring length and substantially parallel to the rotary axis of said escape-wheel, and said rotary axis lies in a plane passing through said oscillatory axis and extending substantially at right angles to said spring length when said unit is at rest; and two pallets provided on said inertia-mass on opposite sides, respectively, of the plane in which said axes lie, and adapted alternately to react with succeeding teeth, respectively, of said wheel in receiving oscillatory impulses therefrom and permitting periodic escapes of the latter, the escape direction of said wheel being such that the component, lengthwise of said spring length, of the thrust exerted by each tooth against either pallet on its movement into locking engagement with the latter, is directed toward said support.

18. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said inertia-mass and spring length being coordinated to form an oscillatory unit the oscillatory axis of which passes substantially through the center of gravity of said inertia-mass and extends at right angles to said spring length and substantially parallel to the rotary axis of said escape-wheel, and said rotary axis lies in a plane passing through said oscillatory axis and extending substantially at right angles to said spring length when said unit is at rest; and two pallets on said inertia-mass on opposite sides of, and equally spaced from, the plane in which said axes lie, said pallets being also equally spaced from said rotary axis when said unit is at rest, and adapted alternately to react with succeeding teeth, respectively, of said wheel in receiving oscillatory impulses therefrom and permitting periodic escapes of the latter, the teeth of said wheel being so shaped that the thrust exerted by each tooth against either pallet on its movement into locking engagement with the latter is in a direction intersecting the oscillatory axis of said unit, and the escape-direction of said wheel is such that the component of said thrust lengthwise of said spring length is directed toward said support.

19. An escapement, comprising a power-driven escape-wheel having peripheral teeth; a fixed support; a leaf-type spring mounted with one end on said support; a rigid inertia-mass mounted on the other end of said spring so that the intermediate length of said spring is resiliently flexible, said intermediate spring length being of uniform cross-section throughout and forming with said inertia-mass an oscillatory unit, said inertia-mass being so arranged that its center of gravity lies substantially on an axis rectangularly intersecting said spring length midway of its longitudinal extent when said unit is at rest, so that said axis is the oscillatory axis of said unit, and the rotary axis of said escape-wheel extends substantially parallel to said oscillatory axis; and two pallets on said inertia-mass on opposite sides, respectively, of the plane in which said axes lie, said pallets being adapted alternately to react with succeeding teeth, respectively, of said wheel in receiving oscillatory impulses therefrom and permitting periodic escapes of the latter.

20. An oscillatory unit of an escapement, said unit comprising a leaf-type spring having provisions at one end for its anchorage on a fixed support; a rigid inertia-mass mounted on the other end of said spring so that the remainder of the spring is resiliently flexible, said inertia-mass being so arranged on said spring that the center of gravity of the former lies substantially on an axis rectangularly intersecting said spring substantially midway between said ends thereof; and two pallets provided on said inertia-mass on opposite sides, respectively, of said axis, the latter being the oscillatory axis of said unit when mounted on the support.

21. An oscillatory unit of an escapement as set forth in claim 20, in which said pallets are equally spaced from said axis and lie in a plane substantially parallel to the plane passing through said axis and extending at right angles to said spring.

22. An oscillatory unit of an escapement as set forth in claim 20, in which said pallets are equally spaced from said axis and lie in a plane substantially parallel to said spring.

References Cited in the file of this patent

UNITED STATES PATENTS

| Number | Name | Date |
|---|---|---|
| 1,771,383 | Roe | July 22, 1930 |
| 2,571,085 | Clifford | Oct. 9, 1951 |

FOREIGN PATENTS

| Number | Country | Date |
|---|---|---|
| 114,123 | Switzerland | Mar. 16, 1926 |
| 363,352 | Great Britain | Dec. 7, 1931 |